US012394989B2

(12) United States Patent
Miyamoto et al.

(10) Patent No.: US 12,394,989 B2
(45) Date of Patent: Aug. 19, 2025

(54) CONTROL DEVICE OF SOLAR POWER GENERATION SYSTEM

(71) Applicant: TOYOTA JIDOSHA KABUSHIKI KAISHA, Toyota (JP)

(72) Inventors: Yuma Miyamoto, Miyoshi (JP); Yukinori Murakami, Toyota (JP); Takashi Fukai, Obu (JP); Akinori Kawamura, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/734,152

(22) Filed: Jun. 5, 2024

(65) Prior Publication Data

US 2025/0079847 A1 Mar. 6, 2025

(30) Foreign Application Priority Data

Aug. 30, 2023 (JP) .................................. 2023-139725

(51) Int. Cl.
*H02J 3/38* (2006.01)
(52) U.S. Cl.
CPC ............ *H02J 3/381* (2013.01); *H02J 2300/26* (2020.01); *H02J 2310/40* (2020.01)
(58) Field of Classification Search
CPC ....................................................... H02J 3/381
See application file for complete search history.

(56) References Cited

U.S. PATENT DOCUMENTS

| | | | |
|---|---|---|---|
| 2012/0205985 A1* | 8/2012 | Inakagata | H02G 3/10 307/82 |
| 2015/0019055 A1* | 1/2015 | Nie | B60L 58/20 701/22 |
| 2018/0026546 A1* | 1/2018 | Iisaka | H02M 7/12 320/140 |
| 2020/0136393 A1* | 4/2020 | Satake | H02S 40/32 |
| 2020/0280207 A1 | 9/2020 | Miyamoto et al. | |
| 2021/0159709 A1* | 5/2021 | Kim | H02J 7/0013 |

FOREIGN PATENT DOCUMENTS

JP 2020-141545 A 9/2020

\* cited by examiner

*Primary Examiner* — Daniel Kessie
(74) *Attorney, Agent, or Firm* — SoraIP, Inc.

(57) ABSTRACT

The control device scans the output voltage of the first converter within a predetermined range to search for a maximum-efficiency voltage. At that time, the control device controls the output voltage of the first converter to the first voltage and acquires the output power of the first converter at that time as the first power, controls the output voltage of the first converter to the second voltage changed by the first change width from the first voltage and acquires the output power of the first converter at that time as the second power, and controls the output voltage of the first converter to the third voltage changed by the second change width from the second voltage in order, and sets the second change width to a value larger than the first change width when the second power is smaller than the first power.

2 Claims, 3 Drawing Sheets

CONTROL DEVICE OF SOLAR POWER GENERATION SYSTEM

CROSS-REFERENCE TO RELATED APPLICATION

This application claims priority to Japanese Patent Application No. 2023-139725 filed on Aug. 30, 2023 incorporated herein by reference in its entirety.

BACKGROUND

1. Technical Field

This disclosure relates to a control device for a solar power generation system.

2. Description of Related Art

A vehicle disclosed in Japanese Unexamined Patent Application Publication No. 2020-141545 (JP 2020-141545 A) includes a solar panel, a direct current (DC)-to-DC converter, and a control device. The solar panel generates electricity by being irradiated by sunlight. The solar panel outputs electric power that is generated to the DC-to-DC converter. The DC-to-DC converter performs voltage conversion of an output voltage from the solar panel, and performs output thereof. The control device controls an output voltage of the DC-to-DC converter.

The control device performs scanning processing for deciding a reference voltage to serve as a reference for controlling the DC-to-DC converter. In the scanning processing, the control device monitors an output electric power of the DC-to-DC converter obtained at each output voltage while gradually changing the output voltage of the DC-to-DC converter within a predetermined range. The control device then decides the output voltage of the DC-to-DC converter when the output electric power of the DC-to-DC converter is greatest, as the reference voltage. The control device then controls the DC-to-DC converter such that the output voltage of the DC-to-DC converter approaches the reference voltage that is decided.

SUMMARY

In technology such as that in JP 2020-141545 A that searches for a reference voltage by scanning processing, in order to start normal control as early as possible, maximally shortening the time taken for the scanning processing is required. JP 2020-141545 A does not discuss this point.

A control device of a solar power generation system for solving the above problem
is applied to a solar power generation system including a solar panel and a DC-to-DC converter for performing voltage conversion of and outputting an output voltage of the solar panel, and is configured to
scan an output voltage of the DC-to-DC converter within a predetermined range, so as to search for a maximum-efficiency voltage, which is the output voltage of the DC-to-DC converter at which an output electric power of the DC-to-DC converter becomes greatest within the predetermined range, and
control the output voltage of the DC-to-DC converter so as to approach the maximum-efficiency voltage, and
in searching for the maximum-efficiency voltage, perform, in the following order, controlling the output voltage of the DC-to-DC converter to a first voltage within the predetermined range,
acquiring the output electric power of the DC-to-DC converter, when the output voltage of the DC-to-DC converter is controlled to the first voltage, as a first electric power,
controlling the output voltage of the DC-to-DC converter to a second voltage within the predetermined range, changed from the first voltage by a first change width,
acquiring the output electric power of the DC-to-DC converter, when the output voltage of the DC-to-DC converter is controlled to the second voltage, as a second electric power, and controlling the output voltage of the DC-to-DC converter to a third voltage within the predetermined range, changed from the second voltage by a second change width in the same direction as the first change width, wherein
when the second electric power is smaller than the first electric power, the second change width is set to a value that is greater than the first change width.

According to the above-described technical idea, the time taken to scan the entire predetermined range when searching for the maximum-efficiency voltage can be shortened.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Overall Configuration

Figure 1:
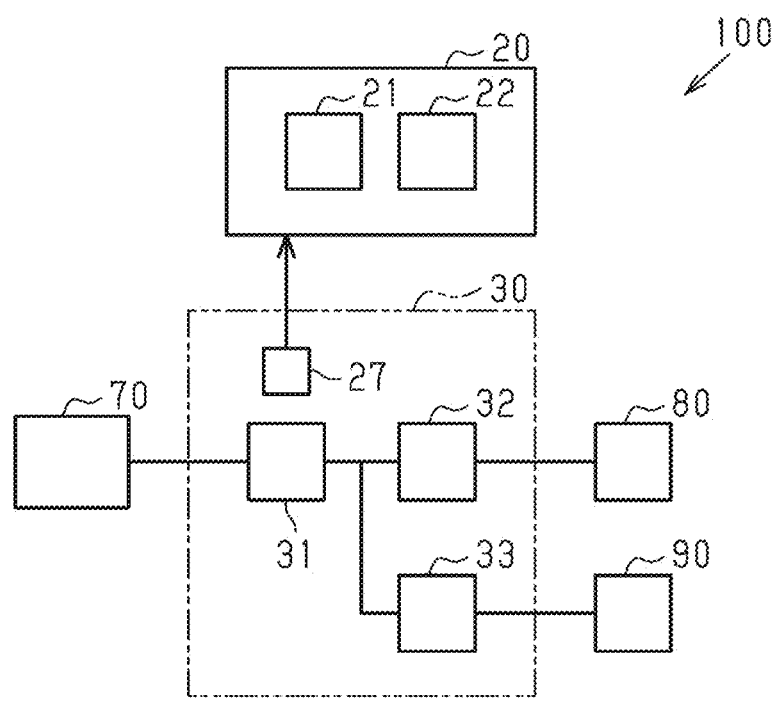
FIG. 1 is a schematic configuration diagram of a vehicle.

Hereinafter, an embodiment of a control device for a solar power generation system will be described with reference to the drawings. As illustrated in FIG. 1, the vehicle 100 includes a solar panel 70, a converter unit 30, a drive battery 80, an auxiliary battery 90, and a control device 20.

The solar panel 70 is formed by arranging a plurality of solar cells that generate electric power by irradiation with sunlight into a panel shape. The solar panel 70 is installed on, for example, a roof of the vehicle 100. The solar panel 70 may be installed on a bonnet of the vehicle 100.

The converter unit 30 supplies the generated electric power of the solar panel 70 to the drive battery 80 and the auxiliary battery 90. Details of the converter unit 30 will be described later. The drive battery 80 is a secondary battery. The drive battery 80 stores electric power supplied from the converter unit 30. The drive battery 80 supplies electric power to a drive system (not shown) mounted on the vehicle 100. The drive train of the vehicle 100 includes one or more motors for driving the vehicle 100.

The auxiliary battery 90 is a secondary battery. The auxiliary battery 90 stores electric power supplied from the converter unit 30. The auxiliary battery 90 supplies electric power to an auxiliary system (not shown) mounted on the vehicle 100. The auxiliary equipment system of the vehicle 100 includes one or more auxiliary equipment. The auxiliary machine is, for example, an electric oil pump, a navigation system, or a lamp.

Converter Unit

The converter unit 30 includes a first DC-to-DC converter 31, a second DC-to-DC converter 32, a third DC-to-DC converter 33, and a measurement circuit 27. The converter unit 30 constitutes a solar power generation system together with the solar panel 70. DC-to-DC converters are voltage converters that step down or step up the DC voltage. In the following description, DC-to-DC converters will be simply referred to as converters without DCDC. For example, the first DC-to-DC converter 31 is referred to as a first converter 31.

The first converter 31 is connected to the solar panel 70. The first converter 31 converts an output voltage of the solar panel 70, which is an input voltage, into a voltage based on an instruction from the control device 20, and outputs the voltage.

The second converter 32 is interposed between the first converter 31 and the drive battery 80. The second converter 32 converts the voltage output from the first converter 31 into a voltage within a predetermined range and outputs the voltage to the drive battery 80.

The third converter 33 is interposed between the first converter 31 and the auxiliary battery 90. The third converter 33 converts the voltage output from the first converter 31 into a voltage within a predetermined range and outputs the voltage to the auxiliary battery 90. The voltage output by the third converter 33 is lower than the voltage output by the second converter 32.

The measurement circuit 27 repeatedly detects the output voltage of the first converter 31 and the output current of the first converter 31 at a predetermined control cycle. The measurement circuit 27 repeatedly outputs a signal corresponding to the output voltage and the output current detected by itself to the control device 20.

a control device.

The control device 20 includes a CPU 21 and a memory 22. The memories 22 store in advance various programs in which processing to be executed by CPU 21 is described. CPU 21 controls the first converter 31, the second converter 32, and the third converter 33 by executing programs stored in the memories 22.

In controlling the first converter 31, CPU 21 sets a voltage indication value Q related to the output voltage of the first converter 31. Then, CPU 21 controls the first converter 31 so as to realize the output voltage of the voltage indication value Q. In controlling the first converter 31, CPU 21 refers to the output electric power from the first converter 31. CPU 21 can calculate the output electric power of the first converter 31 by multiplying the output current of the first converter 31 acquired from the measurement circuit 27 by the output voltage.

Overview of the Control of the First Converter

Figure 2:
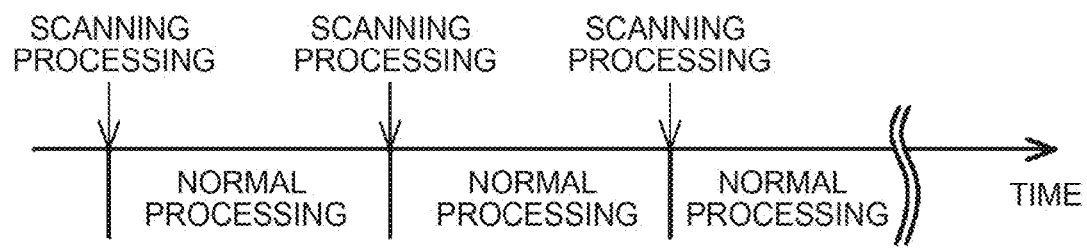
FIG. 2 is a time chart for explaining the execution timing of the scan processing and the normal processing.

CPU 21 is activated as needed while the start switch of the vehicles 100 is turned on as well as while the start switch is turned off. The start switch is a switch for switching on/off of the main system of the vehicle 100. CPU 21 performs processing for the first converter for controlling the first converter 31 while it is activated. There are two types of processing for the first converter: normal processing and scanning processing. As illustrated in FIG. 2, CPU 21 alternately performs the normal processing and the scanning processing. CPU 21 performs a normal processing over a certain period of time, for example, one minute. Then, CPU 21 performs the scanning processing quickly within a very small period of time, for example, within 1 second. That is, CPU 21 basically executes the scanning processing by an interrupt while executing the normal processing.

Figure 3:
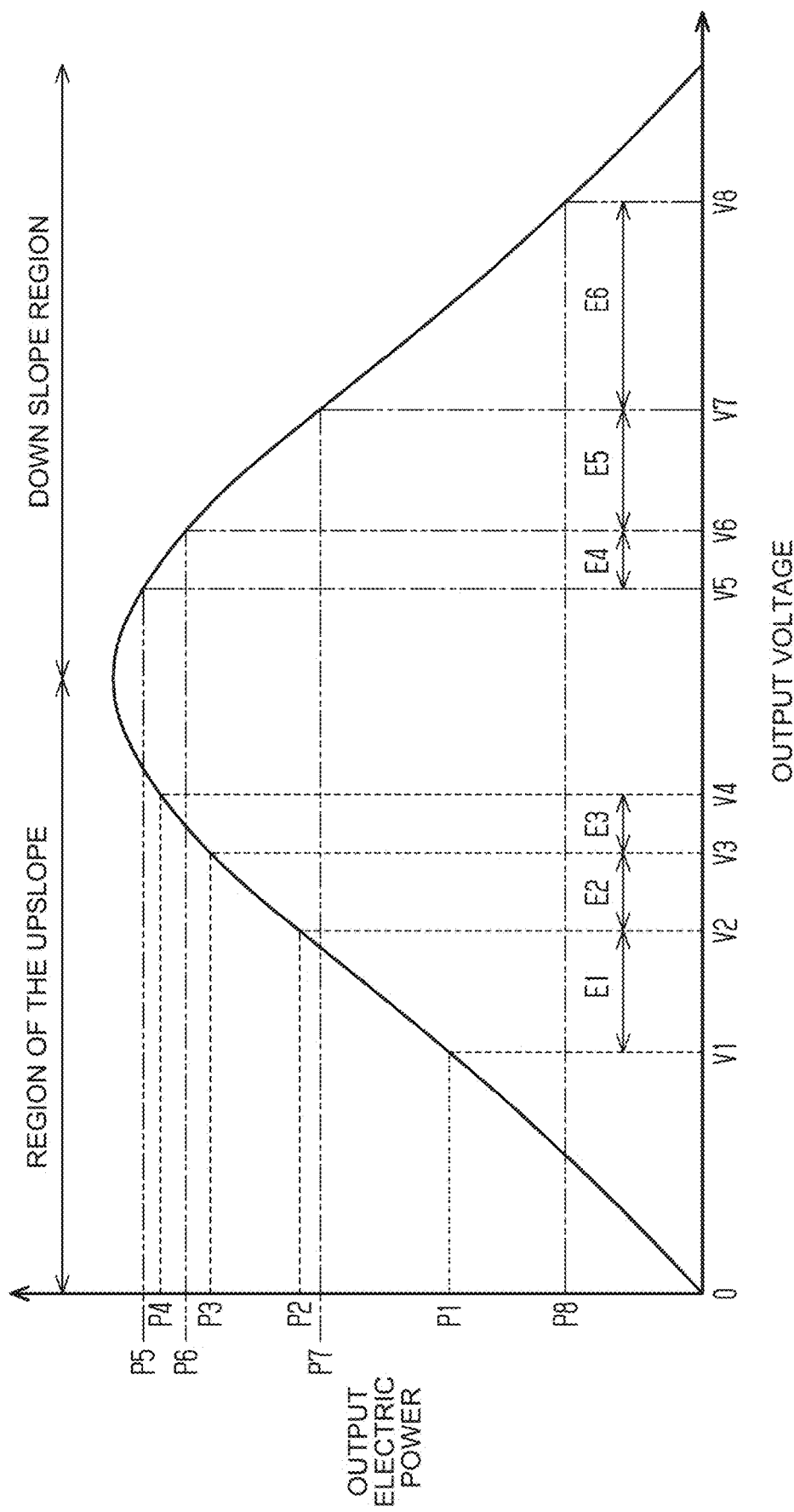
FIG. 3 is a diagram illustrating an exemplary PV property line.

A PV characteristic line which is a prerequisite for the normal processing and the scanning processing will be described. As shown in FIG. 3, an orthogonal coordinate in which the output voltage of the first converter 31 is taken as the X-axis and the output electric power of the first converter 31 is taken as the Y-axis is considered. In this Cartesian coordinate, PV characteristic line represents the correspondence between the output voltage of the first converter 31 and the output electric power of the first converter 31, which can be realized by the first converter 31 in accordance with the current power generation state of the solar panel 70. PV profile is basically a mountain profile. That is, PV characteristic line has a maximum power point at which the output electric power of the first converter 31 is maximized. Note that the shapes indicated by PV property lines differ depending on the conditions in which the solar panel 70 is placed, for example, the amount of solar radiation. PV characteristic lines may be distributed such that there is a plurality of peaks at which the output electric power of the first converters 31 changes from increasing to decreasing. In the following description, one region and the other region sandwiching the peak where the output electric power of the first converter 31 changes from increasing to decreasing are referred to as an upstream gradient region and a downstream gradient region, respectively. The region of the upstream gradient is a region in which the output electric power of the first converter 31 increases as the output voltage of the first converter 31 increases in PV property line. The region of the downward gradient is a region in which the output electric power of the first converter 31 decreases as the output voltage of the first converter 31 increases in PV property line.

In the scanning processing, CPU 21 searches for the maximum-efficiency voltage Y by scanning the output voltage of the first converter 31 within the scanning target area. The maximum-efficiency voltage Y is an output voltage of the first converter 31 that maximizes the output electric power of the first converter 31 within the scanning target range. That is, the maximum-efficiency voltage Y is the output voltage of the first converter 31 corresponding to the maximum electric power point in PV property line. The scanning target range is an output voltage range in which zero is the lower limit value and the characteristic voltage is the upper limit value. The characteristic voltage has the following values. Now, it is assumed that the output voltage of the first converter 31 is increased from zero in PV property line. The output electric power of the first converter 31 when the output voltage of the first converter 31 is zero is zero. When the output voltage of the first converter 31 is increased from zero, the output electric power of the first converter 31 gradually returns to zero while increasing or decreasing. The output voltage of the first converter 31 when the output electric power of the first converter 31 returns to zero is a characteristic voltage. The scanning target range corresponds to a predetermined range.

In the normal processing, CPU 21 controls the output voltage of the first converter 31 so that the output voltage of the first converter 31 approaches the maximum-efficiency voltage Y. In this normal processing, CPU 21 utilizes a known hill-climbing method. Specifically, CPU 21 performs the following processing in the normal processing. CPU 21 controls the first converter 31 by setting the voltage indication value Q for the first converter 31 to the maximum-efficiency voltage Y specified by the scanning processing at the beginning of the normal processing. After that, CPU 21 gradually changes the output voltage of the first converter 31 in such a manner that the output electric power of the first converter 31 increases. Specifically, CPU 21 gradually increases the output voltage of the first converter 31. CPU 21 continues to gradually increase the output voltage of the first converter 31 while the continuation condition is satisfied. The continuation condition is that the output electric power of the first converter 31 is larger than the previous value. CPU 21 switches the direction to change the output voltage of the first converter 31 when the continuation condition is no longer met. That is, CPU 21 gradually decreases the output voltage of the first converters 31. After that, CPU 21 continues to gradually reduce the output voltage of the first converter 31 while the continuation condition is satisfied. Then, CPU 21 switches the direction to change the output voltage of the first converter 31 again when the continuation condition is no longer satisfied. CPU 21, in the normal processing, in this manner, switching the direction to change the output voltage of the first converter 31.

Details of the Scanning Processing

The electric power acquisition processing will be described on the assumption that the scanning processing will be described in detail. CPU 21 performs a electric power acquiring processing as part of the scanning processing. In the electric power obtaining processing, CPU 21 controls the first converter 31 so that the output voltage of the first converter 31 coincides with the voltage indication value Q set in advance. Then, CPU 21 calculates the output electric power of the first converter 31 when the output voltage of the first converter 31 is controlled to coincide with the voltage indication value Q. As described above, CPU 21 can calculate the output electric power of the first converter 31 based on the detection result of the measurement circuit 27. CPU 21 calculating the output electric power of the first converter 31 corresponds to CPU 21 acquiring the output electric power of the first converter 31. When the output electric power of the first converter 31 is acquired, CPU 21 stores one set of the output electric power and the voltage indication value Q, which is the basis for realizing the output electric power, in the memory 22 as scan-result information. CPU 21 performs such a series of processing in the electric power acquiring processing. It should be noted that each time CPU 21 performs the electric power acquiring processing, the scan-result data stored in the memories 22 increases. Hereinafter, a group of the plurality of scan result information stored in the memory 22 is referred to as a result list. The result list is a list in which a plurality of pieces of scan result information are arranged over time.

The initial change width EA will be described on the assumption that the scanning processing is detailed. When CPU 21 scans the output voltage of the first converter 31 within the scan target range, the change width of the output voltage per scan is referred to as a voltage change width E. The initial change width EA is an initial value of the voltage-change width E. The memories 22 store the initial-change width EA in advance. The initial-change width EA is determined in advance from the viewpoint of, for example, experimentation or simulations, for PV characteristic lines in various circumstances in which the amount of sunlight differs. Let us now focus on areas with a certain upward slope in PV property line. The minimum value of the output voltage of the first converter 31, which is the starting point of the region of the upstream gradient, is referred to as the minimum voltage. The initial change width EA is a value adjusted such that, when the voltage indication value Q for the first converter 31 is increased by the initial change width EA from the minimum voltage, the output electric power of the first converter 31 falls within the value in the area of the upstream gradient, that is, the output electric power does not reach the peak of the increase or decrease.

A specific procedure of the scanning processing will be described below. When the scanning processing is started, CPU 21 sets the first voltage indication value Q and then executes S10 processing. CPU 21 sets the initial voltage indication value Q to a value obtained by adding the initial-change width EA to 0.

Figure 4:
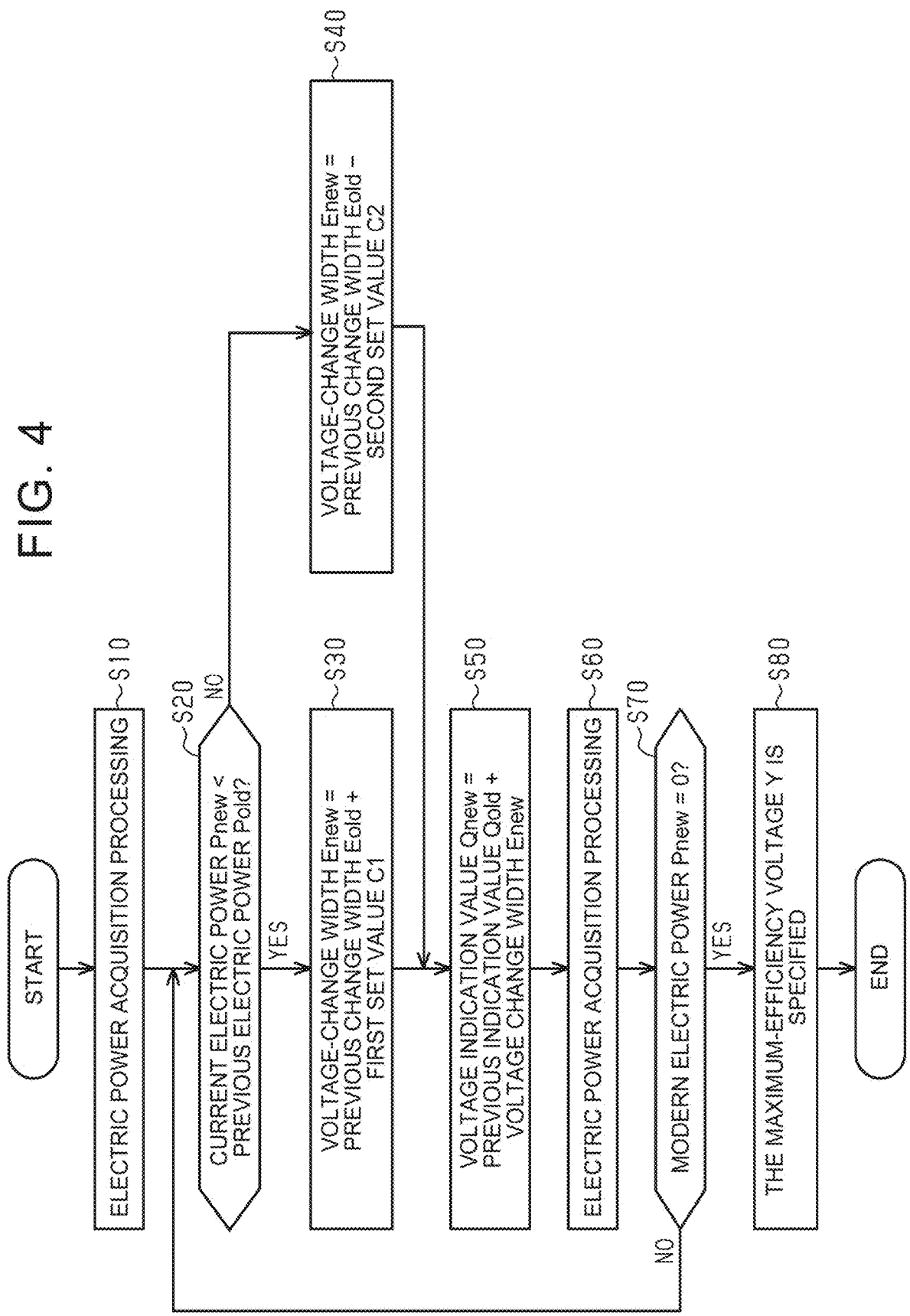
FIG. 4 is a flowchart illustrating a processing procedure of the scan processing.

As illustrated in FIG. 4, in S10, CPU 21 performs an initial electric power acquiring processing. In the first power acquiring processing, CPU 21 controls the first converter 31 based on the first voltage indication value Q and stores the obtained output electric power of the first converter 31 as scan result information in the memory 22. When CPU 21 finishes executing the first electric power acquiring processing, the processing proceeds to S20.

In S20, CPU 21 determines whether the current electric power Pnew is less than the previous electric power Pold. The latest electric power Pnew is the output electric power of the first converters 31 obtained by the latest power acquiring processing. The previous electric power Pold is the output electric power obtained in the power acquisition processing performed one time prior to the latest power acquisition processing. CPU 21 can grasp the latest electric power Pnew and the previous electric power Pold by referring to the outcome list. When CPU 21 executes the processing of the present S20 for the first time after starting the scanning processing, it treats the previous electric power Pold as 0. CPU 21 advances the processing to S40 when the current electric power Pnew is equal to or higher than the previous electric power Pold (S20: NO). The state in which the determination result of S20 is NO is a state in which the control point of the first converter 31 is located on PV characteristic line in the area of the upstream gradient. The control point of the first converter 31 is a combination of the voltage indication value Q for the first converter 31 and the output electric power corresponding to the voltage indication value Q.

In S40, CPU 21 sets a new voltage-change width Enew. Specifically, CPU 21 sets a value obtained by subtracting the second set value C2 from the previous change width Eold, which is the previous value of the voltage change width E, to a new voltage change width Enew. When CPU 21 executes the processing of the present S40 for the first time after the scanning processing is started, the previous change width Eold is set as the initial change width EA. The second set value C2 is defined in advance as a value smaller than the initial-change width EA and larger than zero. For example, the second set value C2 is a value of 10% of the initial-change width EA. The memories 22 store the second set value C2 in advance.

When the value obtained by subtracting the second set value C2 from the previous change width Eold is used as the calculated value, CPU 21 sets the lower limit change width to a new voltage change width Enew instead of the calculated value when the calculated value is smaller than the lower limit change width. The lower limit change width is set to be smaller than the initial change width EA and larger than zero. For example, the lower limit change width is 10% of an initial change width EA. The memory 22 stores the lower limit change width in advance. The lower limit change width is determined in advance from the viewpoint of, for example, experimentation or simulations for PV characteristic lines in various circumstances where the amount of sunlight differs. When the voltage change width E is reduced, the maximum power point of the output electric power in PV characteristic line and thus the maximum-efficiency voltage Y can be detected with high accuracy. On the other hand, when the voltage change width E is reduced, a large amount of time is required to scan the entire scanning target range. The lower limit change width is a value that does not require an excessive time for scanning the entire scanning target range while ensuring that the maximum-efficiency voltage Y can be detected with high accuracy. When CPU 21 sets a new voltage-change width Enew, the processing proceeds to S50.

On the other hand, in S20, when the latest electric power Pnew is smaller than the previous electric power Pold (S20: YES), CPU 21 advances the processing to S30. The state in which S20 is determined to be YES is a state in which the control point of the first converter 31 is located on PV property line in the area of the downward gradient.

In S30, CPU 21 sets a new voltage-change width Enew. Specifically, CPU 21 sets a value obtained by adding the first set value C1 to the previous change width Eold, which is the previous value of the voltage change width E, to a new voltage change width Enew. The first set value C1 is defined in advance as a value smaller than the initial-change width EA and larger than zero. For example, the first set value C1 is a value of 50% of the initial-change width EA. The memories 22 store the first set value C1 in advance.

When the value obtained by adding the first set value C1 to the previous change width Eold is used as the calculated value, CPU 21 sets the upper limit change width to a new voltage change width Enew instead of the calculated value when the calculated value is larger than the upper limit change width. For example, the upper limit change width is five times the initial change width EA. The memory 22 stores the upper limit change width in advance. The upper limit change width is determined in advance by, for example, experimentation or simulations from the following viewpoints with respect to PV characteristic lines under various conditions in which the amount of sunshine differs. As described above, PV characteristic lines may be distributed such that there is a plurality of peaks at which the output electric power of the first converters 31 changes from increasing to decreasing. If PV characteristic line is such a profile, there is a concern if the voltage-change width E is too large. That is, when the output voltage of the first converter 31 is increased by the voltage change width E, there is a possibility that the control point of the first converter 31 located in the region of the downward gradient reaches the peak of the next upstream region. The upper limit change width is determined from the viewpoint of suppressing such a situation. When CPU 21 sets a new voltage-change width Enew, the processing proceeds to S50.

In S50, CPU 21 sets a new voltage indication value Qnew. Specifically, CPU 21 sets a value obtained by adding the voltage change width Enew calculated by S30 or S40 to the previous indication value Qold, which is the previous value of the voltage indication value Q, to a new voltage indication value Qnew. When CPU 21 sets a new voltage indication value Qnew, the processing proceeds to S60.

In S60, CPU 21 performs electric power acquiring processing. In other words, CPU 21 controls the first converter 31 based on the voltage indication value Qnew set by S50, and stores the obtained output electric power of the first converter 31 as the scan result information in the memory 22. After that, CPU 21 advances the processing to S70.

In S70, CPU 21 determines whether the current electric power Pnew is zero. The current electric power Pnew is the output electric power obtained by S60. CPU 21 returns to S20 processing if the current electric power Pnew is greater than zero (S70: NO). On the other hand, if the current electric power Pnew is S70: YES, CPU 21 advances the processing to S80. The state in which the determination result of S70 is YES corresponds to a state in which the output voltage of the first converter 31 reaches the upper limit of the scan target area.

In S80, the maximum-efficiency voltage Y is determined. More specifically, CPU 21 identifies the maximum of the plurality of output electric powers in the result-list stored in the memory 22. Then, CPU 21 specifies the voltage indication value Q associated with the maximum value as the maximum-efficiency voltage Y. After that, CPU 21 erases the result-list from the memory 22, and then terminates the series of processing of the scanning processing.

Operations of Embodiment

Now, it is assumed that the scanning processing is being executed. It is assumed that CPU 21 scans an upstream area of PV property line. Then, CPU 21 repeats the following processing in the scanning processing. That is, since the latest electric power Pnew is larger than the previous electric power Pold (S20: NO), CPU 21 sets the new voltage-change width Enew to be smaller than the previous change width Eold (S40). Then, CPU 21 sets a value larger than the previous indicated value Qold by the voltage change width Enew to a new voltage indication value Qnew (S50). Then, CPU 21 performs electric power acquiring processing based on the voltage indication value Qnew (S60). By repeatedly reducing the new voltage change width Enew in S40 with respect to the previous change width Eold, CPU 21 gradually reduces the new voltage change width Enew. In this regard, four consecutive timings will be specifically described as examples. In other words, CPU 21 sequentially performs the following processing when searching for the maximum-efficiency voltage Y. As shown in FIG. 3, first, at the first timing, CPU 21 controls the output voltage of the first converter 31 to the first voltage V1 and acquires the output electric power of the first converter 31 at that time as the first power P1. At the next second timing, CPU 21 controls the output voltage of the first converter 31 to a second voltage V2 that is changed from the first voltage V1 to a larger value by the first change width E1, and acquires the output electric power of the first converter 31 at that time as the second power P2. At the following third timing, CPU 21 controls the output voltage of the first converter 31 to the third voltage V3 that is changed from the second voltage V2 to the third voltage V3 that is larger by the second change width E2, and acquires the output electric power of the first converter 31 at that time as the third power P3. At this time, CPU 21 sets the second change width E2 to be smaller than the first change width E1. Furthermore, in the fourth timing after the third timing, CPU 21, the output voltage of the first converter 31, and controls the fourth voltage V4 which is changed from the third voltage V3 to the third change width E3 larger side, the output electric power of the first converter 31 at that time as a fourth power P4 to obtain. Also at this time, CPU 21 sets the third change width E3 to be smaller than the second change width E2.

Now consider the situation where CPU 21 is scanning the downstream area of PV property line. In the scanning processing, CPU 21 repeats the following processing. That is, as shown in FIG. 4, since the latest electric power Pnew is smaller than the previous electric power Pold (S20: YES), CPU 21 sets the new voltage-change width Enew to be larger than the previous change width Eold (S30). Then, CPU 21 sets a value larger than the previous indicated value Qold by the voltage change width Enew to a new voltage indication value Qnew (S50). Then, CPU 21 performs electric power acquiring processing based on the voltage indication value Qnew (S60). By repeatedly increasing the new voltage change width Enew in S30 with respect to the previous change width Eold, CPU 21 gradually increases the new voltage change width Enew. In this regard, four consecutive timings will be specifically described as examples. Here, the fifth, sixth, seventh, and eighth timings after the fourth timing are taken as an example. CPU 21 sequentially performs the following processing when searching for the maximum-efficiency voltage Y. As shown in FIG. 3, first, at a fifth timing, CPU 21 controls the output voltage of the first converter 31 to the fifth voltage V5 and acquires the output electric power of the first converter 31 at that time as the fifth power P5. At the next sixth timing, CPU 21 controls the output voltage of the first converter 31 to the sixth voltage V6 that is changed from the fifth voltage V5 to a larger value by the fourth change width E4, and acquires the output electric power of the first converter 31 at that time as the sixth power P6. At the next seventh timing, CPU 21 controls the output voltage of the first converter 31 to the seventh voltage V7 that is changed from the sixth voltage V6 to a larger value by the fifth change width E5, and acquires the output electric power of the first converter 31 at that time as the seventh power P7. At this time, CPU 21 sets the fifth change width E5 to be larger than the fourth change width E4. Further, in the eighth timing after the seventh timing, CPU 21, the output voltage of the first converter 31, the output voltage of the seventh voltage V7 as well as controlled to the eighth voltage V8 which is changed to a large side by the sixth change width E6, the output electric power of the first converter 31 at that time as an eighth power P8 to obtain. Similar to the difference between the fourth change width E4 and the fifth change width E5, CPU 21 sets the sixth change width E6 to be larger than the fifth change width E5. Note that the voltage, electric power, and voltage change width at each timing shown in FIG. 3 are examples for explaining the operation of the present embodiment, and do not necessarily coincide with the actual one.

Effects of Embodiment (1) If the current electric power Pnew is less than the previous electric power Pold (S20: YES), the region of PV property line that CPU 21 is currently scanning is likely to be the region of the down slope. That is, the output electric power of the first converter 31 when the output voltage of the first converter 31 is further increased is more likely to be smaller than the latest electric power Pnew when the latest electric power Pnew is smaller than the previous electric power Pold. It is unlikely that the output electric power at this time becomes the largest power point in PV property line. In this case, even if the voltage change width E in setting the new voltage indication value Qnew is large, it is unlikely that CPU 21 will fail to detect the maximum electric power point and thus the maximum-efficiency voltage Y. Therefore, when the latest electric power Pnew is smaller than the previous electric power Pold, CPU 21 makes the new voltage-change width Enew larger than the previous change width Eold (S30). In this way, by increasing the single change width of the output voltage of the first converter 31, it is possible to shorten the time when CPU 21 scans the entire scan object range when CPU 21 detects the maximum-efficiency voltage Y.

(2) If the current electric power Pnew is greater than the previous electric power Pold (S20: NO), the region of PV property line that CPU 21 is currently scanning is likely to be an upstream gradient region. That is, it is highly likely that the output electric power of the first converter 31 becomes larger than the latest electric power Pnew when the output voltage of the first converter 31 is further increased if the latest electric power Pnew is larger than the previous power Pold. Then, the output electric power of the first converter 31 at that time may be the largest power point in PV property line. If a change width in the output voltage of the first converter 31 is large, the maximum electric power point and thus the maximum-efficiency voltage Y in PV characteristic line may not be detected. In other words, if the change width of the output voltage of the first converter 31 is large, the output electric power of the first converter 31 may exceed the maximum power point in PV property line and reach the down-gradient area. Conversely, in the case of scanning the region of the upward slope, when reducing the once change width of the output voltage of the first converter 31, can accurately detect the maximum electric power point and thus the maximum-efficiency voltage Y. Therefore, when the latest electric power Pnew is larger than the previous electric power Pold, CPU 21 sets the voltage-change width E to be smaller than the previous-change width Eold (S40). In this manner, the maximum electric power point and thus the maximum-efficiency voltage Y in PV characteristic line can be accurately detected by reducing the change width of the output voltage of the first converters 31 at one time.

Modifications

The above embodiment can be implemented with the following modifications. The above embodiments and the following modifications can be combined with each other within a technically consistent range to be implemented.

When the control point of the first converter 31 is switched from the region of the upstream gradient to the region of the downstream gradient on PV property line, the previous change width Eold may be reset to the initial change width EA. In this regard, the same applies to the case where the control point of the first converter 31 is switched to the region of the upstream gradient from the region of the downstream gradient on PV property line.

A method of setting a new voltage-change width Enew in S30 is not limited to the above-described embodiment. For example, the first set value C1 may be changed from the exemplary embodiment. The first set value C1 may be the same as the second set value C2. The first set value C1 may be changed every time processing of S30 is performed. A new voltage-change width Enew may be set by appropriately adopting a preferable method from the viewpoint of shortening the time when scanning the entire scanning target area.

The upper limit change width is not limited to the example of the above-described embodiment. The upper limit change width may be any value suitable for the upper limit of the voltage change width E for the region of the downward gradient. The upper limit change width may be eliminated.

In the above-described embodiment, each time CPU 21 performs S30 processing while CPU 21 is scanning the downward slope area, the new voltage-change width Enew is changed. Then, the new voltage-change width Enew is gradually changed. However, it is not essential to gradually change the new voltage-change width Enew in this manner. CPU 21 may increase the new voltage-change width Enew with respect to the previous change width Eold at least once while scanning the down-slope area.

A method of setting a new voltage-change width Enew in S40 is not limited to the above-described embodiment. For example, the second set value C2 may be changed from the exemplary embodiment. The second set value C2 may be changed each time processing of S40 is performed. From the viewpoint of accurately detecting the maximum-efficiency voltage Y, a new voltage change width Enew may be set by appropriately adopting a preferable method.

The lower limit change width is not limited to the example of the above-described embodiment. The lower limit change width may be a value suitable for the lower limit of the voltage-change width Enew for the region of the upward gradient. The lower limit change width may be greater than zero.

In the above-described embodiment, each time CPU 21 performs S40 processing while CPU 21 is scanning the uphill gradient area, a new voltage-change width Enew is changed. Then, the new voltage-change width Enew is gradually changed. However, it is not essential to gradually change the new voltage-change width Enew in this manner. CPU 21 may reduce the new voltage-change width Enew with respect to the previous change width Eold at least once during the scan of the uphill gradient area.

It is not mandatory to change the voltage-change width E while CPU 21 is scanning an area of the uphill gradient. That is, the same voltage change width E may always be used in the region of the upstream gradient.

In the above embodiment, the maximum-efficiency voltage Y is searched for while increasing the output voltage of the first converter 31 from zero. On the contrary, the output voltage of the first converter 31 may be reduced from the upper limit side of the scanning target range to search for the maximum-efficiency voltage Y.

The configuration of the solar power generation system is not limited to the example of the above-described embodiment. For example, the number of solar panels may be changed from the example of the above embodiment. In addition, the number of DC-to-DC converters may be changed in accordance with the magnitude of the required electric power, the number of electric power destinations, and the like. The solar power generation system may include at least one solar panel and a DC-to-DC converter that converts an output voltage of the solar panel into a voltage and outputs the converted voltage.

What is claimed is:

1. A control device of a solar power generation system, wherein:
   the control device is applied to a solar power generation system including a solar panel and a DC-to-DC converter for performing voltage conversion of and outputting an output voltage of the solar panel, and is configured to
   scan the output voltage of the DC-to-DC converter within a predetermined range, so as to find a maximum-efficiency voltage, which is the output voltage of the DC-to-DC converter at which output electric power of the DC-to-DC converter is maximized within the predetermined range, and
   control the output voltage of the DC-to-DC converter so as to approach the maximum-efficiency voltage, and
   in searching for the maximum-efficiency voltage, perform, in the following order,
   controlling the output voltage of the DC-to-DC converter to a first voltage within the predetermined range,
      acquiring the output electric power of the DC-to-DC converter, when the output voltage of the DC-to-DC converter is controlled to the first voltage, as a first electric power,
      controlling the output voltage of the DC-to-DC converter to a second voltage within the predetermined range, changed from the first voltage by a first change width,
      acquiring the output electric power of the DC-to-DC converter, when the output voltage of the DC-to-DC converter is controlled to the second voltage, as a second electric power, and
      controlling the output voltage of the DC-to-DC converter to a third voltage within the predetermined range, changed from the second voltage by a second change width in the same direction as the first change width; and
   when the second electric power is smaller than the first electric power, the second change width is set to a value that is greater than the first change width.

2. The control device according to claim 1, wherein the second change width is set to a value that is smaller than the first change width when the second electric power is no smaller than the first electric power.

* * * * *